(12) United States Patent
Lee et al.

(10) Patent No.: US 11,485,654 B2
(45) Date of Patent: Nov. 1, 2022

(54) METHOD FOR PREPARING A CATALYST AND USING THE CATALYST FOR WASTEWATER TREATMENT

(71) Applicant: Korea University Research and Business Foundation, Seoul (KR)

(72) Inventors: Kwan-Young Lee, Seoul (KR); Min June Kim, Seoul (KR); Min Woo Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 467 days.

(21) Appl. No.: 16/368,912

(22) Filed: Mar. 29, 2019

(65) Prior Publication Data

US 2020/0207648 A1    Jul. 2, 2020

(30) Foreign Application Priority Data

Dec. 27, 2018 (KR) ......................... 10-2018-0170067

(51) Int. Cl.
| | |
|---|---|
| C02F 1/72 | (2006.01) |
| B01J 37/02 | (2006.01) |
| B01J 37/08 | (2006.01) |
| B01J 21/08 | (2006.01) |
| B01J 23/89 | (2006.01) |

(Continued)

(52) U.S. Cl.
CPC .............. *C02F 1/725* (2013.01); *B01J 21/08* (2013.01); *B01J 23/8906* (2013.01); *B01J 35/1061* (2013.01); *B01J 37/0205* (2013.01); *B01J 37/0236* (2013.01); *B01J 37/08* (2013.01); *C02F 1/66* (2013.01); *C02F 1/722* (2013.01); *C02F 2101/345* (2013.01); *C02F 2101/38* (2013.01); *C02F 2305/023* (2013.01)

(58) Field of Classification Search
CPC .... B01J 21/08; B01J 23/8906; B01J 29/0333; B01J 35/002; B01J 35/1061; B01J 37/0205; B01J 37/0236; B01J 37/0242; B01J 37/08; C02F 1/66; C02F 1/722; C02F 1/725; C02F 2101/345; C02F 2101/38; C02F 2305/023

See application file for complete search history.

(56) References Cited

U.S. PATENT DOCUMENTS

| | | | | |
|---|---|---|---|---|
| 5,518,979 | A | * | 5/1996 | Bonse ...................... B01J 21/04 502/355 |
| 2002/0153329 | A1 | * | 10/2002 | Hempel .................. C02F 1/725 210/759 |

(Continued)

FOREIGN PATENT DOCUMENTS

JP    2017-140572 A    8/2017

OTHER PUBLICATIONS

Zhang, Alli, et al., "Heterogeneous Fenton-like catalytic removal of p-nitrophenol in water using acid-activated fly ash," *Journal of Hazardous Materials*, 201, 2012 (pp. 68-73).

(Continued)

*Primary Examiner* — Hayden Brewster
(74) *Attorney, Agent, or Firm* — NSIP Law

(57) ABSTRACT

A catalyst for wastewater treatment is disclosed. The catalyst includes a porous carrier, iron oxide impregnated into the pores of the porous carrier, and platinum impregnated into the pores and mixed with the iron oxide in the pores. Also disclosed are a method for preparing the catalyst and a method for wastewater treatment using the catalyst.

15 Claims, 2 Drawing Sheets

(51) Int. Cl.
*B01J 35/10* (2006.01)
*C02F 1/66* (2006.01)
*C02F 101/38* (2006.01)
*C02F 101/34* (2006.01)

(56) References Cited

U.S. PATENT DOCUMENTS

| | | | |
|---|---|---|---|
| 2005/0067356 A1* | 3/2005 | Bowman | B09C 1/08 405/128.5 |
| 2011/0124490 A1* | 5/2011 | Schwarzer | B01J 37/0201 502/74 |
| 2015/0368115 A1* | 12/2015 | Parvulescu | B01J 37/0045 423/706 |

OTHER PUBLICATIONS

Duan, Feng, et al., "Heterogeneous Fenton-like degradation of 4-chlorophenol using iron/ordered mesoporous carbon catalyst," *Journal of Environmental Sciences*, 26, 5, 2014 (pp. 1171-1179).
Korean Notice of Allowance dated Apr. 8, 2021 in counterpart Korean Patent Application No. 10-2018-0170067 (3 pages in Korean).

\* cited by examiner

METHOD FOR PREPARING A CATALYST AND USING THE CATALYST FOR WASTEWATER TREATMENT

CROSS-REFERENCE TO RELATED APPLICATIONS

This application claims the benefit under 35 USC § 119(a) of Korean Patent Application No. 10-2018-0170067 filed on Dec. 27, 2018 in the Korean Intellectual Property Office, the entire disclosure of which is incorporated herein by reference for all purposes.

BACKGROUND OF THE INVENTION

1. Field of the Invention

The present invention relates to a catalyst for wastewater treatment, a method for preparing the catalyst, and a method for wastewater treatment using the catalyst. More specifically, the present invention relates to a catalytic technology for the treatment of persistent wastewater with OH radicals produced from hydrogen peroxide at low temperature.

2. Description of the Related Art

Industrial wastewater from chemical industries needs to be treated with water to remove pollutants before its discharge. Aromatics, halides, and other pollutants are present in persistent industrial wastewater. These pollutants are difficult to remove by microbial treatment, which is the most widely used technique for wastewater treatment. Under such circumstances, advanced oxidation processes have attracted increasing attention as chemical methods for removing pollutants from wastewater.

According to advanced oxidation processes, materials with strong oxidizing power are applied to pollutants to oxidize the pollutants, achieving increased biodegradability of the pollutants. Advanced oxidation processes are employed as pretreatment steps for increasing the efficiency of microbial wastewater treatment or methods for fully oxidizing pollutants to carbon dioxide. Ozone ($O_3$), hydrogen peroxide ($H_2O_2$), and high-pressure air ($O_2$) are available for the oxidation of pollutants. Particularly, OH radicals produced from hydrogen peroxide are advantageous in removing pollutants by oxidation due to their high oxidation potential.

Many methods for the production of OH radicals are known in which organic matter-containing raw wastewater to be treated is introduced into a high pressure ozone tank by spraying, the ozone is dissolved in the sprayed raw water, and UV is transmitted through the ozone-dissolved raw water to produce hydroxyl radicals, which are used to remove the organic matter from the raw water.

However, such conventional OH radical production techniques require high costs for equipment, which is undesirable from the viewpoint of economic efficiency. Thus, there is an urgent need for a solution to the problems of conventional OH radical production methods.

SUMMARY OF THE INVENTION

The present invention has been made in an effort to solve the problems of the prior art and one aspect of the present invention is to provide a catalyst for wastewater treatment in which iron oxide and platinum coexist in and are impregnated into a porous carrier.

A further aspect of the present invention is to provide a method for preparing a catalyst for wastewater treatment by sequentially impregnating an iron oxide precursor and a platinum precursor into a porous carrier and individually calcining the precursors at specific temperatures.

Another aspect of the present invention is to provide a method for wastewater treatment in which OH radicals are effectively produced from hydrogen peroxide using the catalyst to oxidize persistent wastewater.

The present invention provides a catalyst for wastewater treatment including a porous carrier, iron oxide impregnated into the pores of the porous carrier, and platinum impregnated into the pores and mixed with the iron oxide in the pores.

The porous carrier may be selected from the group consisting of silica carriers, zeolite carriers, activated carbon carriers, and combinations thereof.

The iron oxide may be impregnated in an amount of 1 to 10% by weight, based on the total weight of the porous carrier.

The platinum may be impregnated in an amount of 0.1 to 5% by weight, based on the total weight of the porous carrier.

The present invention also provides a method for wastewater treatment including (a) impregnating an aqueous iron oxide precursor solution into the pores of a porous carrier, (b) primarily calcining the porous carrier impregnated with the aqueous iron oxide precursor solution, (c) impregnating an aqueous platinum precursor solution into the pores of the primarily calcined porous carrier, and (d) secondarily calcining the porous carrier impregnated with the aqueous platinum precursor solution.

The primary calcining may be performed at a temperature of 400 to 600° C. for 4 to 8 hours.

The secondary calcining may be performed at a temperature of 400 to 600° C. for 4 to 8 hours.

The impregnation of the aqueous precursor solutions in steps (a) and (c) may be performed by incipient wetness impregnation.

The present invention also provides a method for wastewater treatment including adding the catalyst for wastewater treatment and hydrogen peroxide to wastewater to react with the wastewater.

The pH of the wastewater may be from 2 to 6.

The pH may be adjusted by adding at least one acid selected from the group consisting of sulfuric acid, hydrochloric acid, phosphoric acid, and nitric acid to the wastewater.

The wastewater may contain at least one pollutant selected from the group consisting of phenol and nitrophenol.

The pollutant may be present at a concentration of 1 to 1000 ppm.

The concentration of the hydrogen peroxide may be from 5 to 5000 ppm.

The reaction temperature may be from 15 to 40° C.

Features and advantages of the present invention will become more apparent from the detailed description set forth below with reference to the accompanying drawings.

It should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

The catalyst of the present invention has a structure in which the iron oxide and the platinum coexist in and are impregnated into the porous carrier. Due to this structure, the catalyst of the present invention enables effective production of OH radicals from hydrogen peroxide at low temperature.

In addition, hydrogen peroxide is decomposed at low temperature by the interaction between the platinum and the iron oxide to produce OH radicals that are active in removing pollutants such as phenol. Therefore, the use of the catalyst according to the present invention enables the oxidation of a large amount of persistent wastewater discharged from industrial facilities in an economical manner.

DETAILED DESCRIPTION OF THE INVENTION

Figure 1:
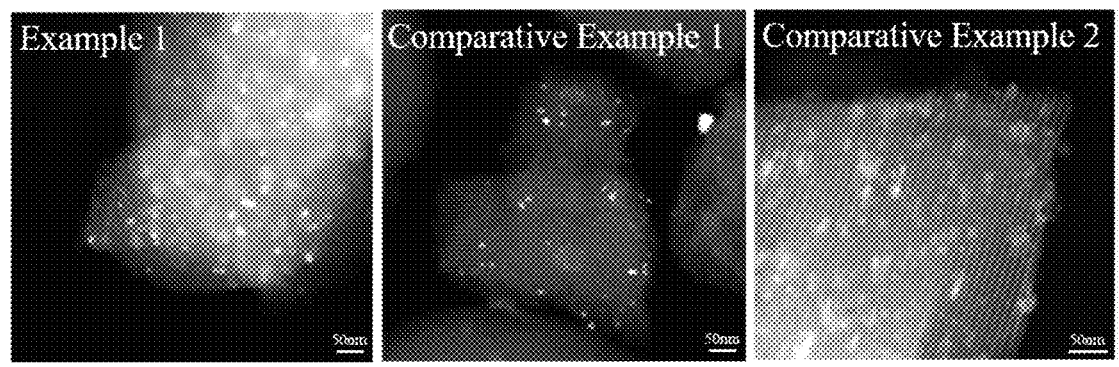
FIG. 1 shows scanning transmission electron microscopy (STEM) images of catalysts for wastewater treatment prepared in Example 1 and Comparative Examples 1 and 2.

Other objects, advantages, and novel features of the invention will become more apparent from the following detailed description and preferred embodiments with reference to the appended drawings. In the drawings, the same elements are denoted by the same reference numerals even though they are depicted in different drawings. Although such terms as "first" and "second," etc. may be used to describe various elements, these elements should not be limited by above terms. These terms are used only to distinguish one element from another. In the description of the present invention, detailed explanations of related art are omitted when it is deemed that they may unnecessarily obscure the essence of the present invention.

Preferred embodiments of the present invention will now be described in detail with reference to the accompanying drawings.

A catalyst for wastewater treatment according to one embodiment of the present invention includes a porous carrier, iron oxide impregnated into the pores of the porous carrier, and platinum impregnated into the pores and mixed with the iron oxide in the pores.

The catalyst of the present invention enables the production OH radicals from hydrogen peroxide to treat persistent wastewater. In contrast, conventional catalysts for producing OH radicals using ozone or UV light are economically disadvantageous because high equipment costs are incurred and high temperature is required to decompose hydrogen peroxide. The catalyst of the present invention is aimed at providing a solution to the problems of conventional catalysts for wastewater treatment.

Specifically, the catalyst of the present invention includes a porous carrier, iron oxide, and platinum.

The porous carrier refers to a porous member that has a number of pores and accommodates the iron oxide and the platinum. The pores may be micropores or mesopores. Generally, micropores are defined as pores having a size of 2 nm or less and mesopores are defined as pores having a size larger than 2 nm and smaller than 50 nm. However, the pore size of the porous carrier is not necessarily limited as long as the iron oxide and the platinum coexist in and are impregnated into the porous carrier. For example, the porous carrier may be a mesoporous silica carrier. The material for the porous carrier is not necessarily limited to silica and may be selected from the group consisting of silica, zeolite, activated carbon, and mixtures thereof.

The iron oxide is impregnated into the pores of the porous carrier. The iron oxide may be impregnated in an amount of 1 to 10% by weight, based on the total weight of the porous carrier. The iron oxide arranged in the pores may be in the form of particles. For ionic iron catalysts, ferrous and ferric ions undergo a redox reaction with hydrogen peroxide to produce OH radicals, but the iron ions need to be removed after wastewater treatment. The removal of the iron ions produces a large amount of sludge, making it impossible to reuse the iron ions. The use of iron oxide as a catalyst enables the production of OH radicals based on the similar principle but the iron oxide catalyst is difficult to use for the removal of organic pollutants such as phenol at a reaction temperature of around 20° C., for example, 15 to 40° C., due to its low catalytic activity at low temperature. In the present invention, this difficulty is overcome by impregnating the platinum together with the iron oxide in the pores.

The platinum coexists with the iron oxide in the porous carrier. The platinum is impregnated in an amount of 0.1 to 5% by weight, preferably 0.1 to 1% by weight, based on the total weight of the porous carrier. The platinum arranged in the pores may be in the form of particles. If the platinum is impregnated alone, the catalyst has an outstanding ability to decompose hydrogen peroxide at low temperature but exhibits poor activity for the removal of pollutants such as phenol. This is because a large portion of the platinum present in a metal state in the carrier directly converts some OH radicals produced from hydrogen peroxide into $H_2O$ or $O_2$ and only the unconverted OH radicals react with pollutants such as phenol. In contrast, the impregnated platinum coexisting with the iron oxide decomposes hydrogen peroxide to effectively produce OH radicals even at a low temperature (for example, 15-40° C.). In addition, since the impregnated platinum affected by the iron oxide has properties close to those of its oxide, the catalyst has activity for phenol removal without converting the produced OH radicals into $H_2O$ or $O_2$.

Overall, the catalyst of the present invention has a structure in which the iron oxide and the platinum coexist in and are impregnated into the porous carrier. This structure is effective in producing OH radicals from hydrogen peroxide at low temperature based on the interaction between the platinum and the iron oxide and ensures high activity of the catalyst for the removal of pollutants such as phenol. Therefore, the use of the catalyst according to the present invention enables the oxidation of a large amount of persistent wastewater discharged from industrial facilities in an economical manner.

A description will be given about a method for preparing the catalyst for wastewater treatment according to the present invention. Since the catalyst for wastewater treatment has been described above, repeated explanation of the catalyst is omitted or simply provided in this description.

The method of the present invention includes (a) impregnating an aqueous iron oxide precursor solution into the pores of a porous carrier, (b) primarily calcining the porous carrier impregnated with the aqueous iron oxide precursor solution, (c) impregnating an aqueous platinum precursor solution into the pores of the primarily calcined porous carrier, and (d) secondarily calcining the porous carrier impregnated with the aqueous platinum precursor solution.

The catalyst for wastewater treatment is prepared by the following procedure. First, an aqueous iron oxide precursor solution is impregnated into the pores of a porous carrier. The impregnation of the aqueous iron oxide precursor solution into the pores of the porous carrier can be performed by an incipient wetness impregnation method. The incipient wetness impregnation is repeated several times for sufficient impregnation of the porous carrier with the aqueous iron oxide precursor solution. The impregnated porous carrier is dried after each cycle of impregnation. The porous carrier may be selected from the group consisting of mesoporous silica carriers, mesoporous zeolite carriers, mesoporous activated carbon carriers, and combinations thereof. The aqueous iron oxide precursor solution can be impregnated in such an amount that the weight of iron oxide is from 1 to 10% by weight, based on the total weight of the porous carrier. The iron oxide precursor is an iron salt and is not particularly limited as long as it acts as an iron ion source. For example, the iron oxide precursor may be ferric nitrate. When incipient wetness impregnation is used, the porous carrier impregnated with the aqueous iron oxide precursor solution may be dried at 80 to 120° C. for 12 to 24 hours.

Next, the porous carrier impregnated with the aqueous iron oxide precursor solution is primarily calcined. The primary calcination may be performed at a temperature of 400 to 600° C. for 4 to 8 hours. The calcination yields iron oxide.

Next, an aqueous platinum precursor solution is impregnated into the pores of the primarily calcined porous carrier. The aqueous platinum precursor solution can be impregnated in such an amount that the weight of platinum is from 0.1 to 5% by weight, preferably 0.1 to 1% by weight, based on the total weight of the porous carrier. The platinum precursor is a platinum salt and is not particularly limited as long as it acts as a platinum ion source. For example, the platinum precursor may be tetraammineplatinum(II) nitrate or platinum nitrate. The impregnation of the aqueous platinum precursor solution can be performed by an incipient wetness impregnation method. When incipient wetness impregnation is used, the porous carrier impregnated with the aqueous platinum precursor solution may be dried at 80 to 120° C. for 12 to 24 hours.

Finally, the porous carrier impregnated with the aqueous platinum precursor solution is secondarily calcined. The secondary calcination may be performed at a temperature of 400 to 600° C. for 4 to 8 hours. The secondary calcination yields platinum, and as a result, iron oxide and platinum coexist in and are impregnated into the pores of the porous carrier.

A description will be given about a method for wastewater treatment using the catalyst according to the present invention.

As described above, the catalyst used in the method of the present invention has a structure in which iron oxide and platinum are impregnated into the pores of a porous carrier. The method of the present invention includes adding the catalyst and hydrogen peroxide to wastewater to be treated.

The wastewater can be accommodated in a reactor. The wastewater may be persistent wastewater containing at least one pollutant selected from the group consisting of phenol and nitrophenol. The pollutant may be present at a concentration of 1 to 1000 ppm. The pollutant does not necessarily need to be present in the wastewater.

The catalyst decomposes the hydrogen peroxide to produce OH radicals, which are advantageous in removing the pollutant by oxidation due to their strong oxidizing power. As described above, the catalyst is active in removing the pollutant even at low temperature. The activity of the catalyst is maintained as long as the reaction temperature is kept at 15 to 40° C., preferably 20 to 25° C.

The hydrogen peroxide is a reactant that produces OH radicals to induce the oxidation of the pollutant. Here, the concentration of the hydrogen peroxide may be from 5 to 5000 ppm. If the concentration of the hydrogen peroxide is less than 5 ppm, OH radicals are slowly produced. Meanwhile, if the concentration of the hydrogen peroxide is higher than 5000 ppm, the resulting OH radicals react with hydrogen peroxide remaining in the solution. The self-reaction makes it impossible for the OH radicals to be involved in the oxidation of the pollutant. Accordingly, the concentration of the hydrogen peroxide should be adjusted to the range defined above.

The decomposition of hydrogen peroxide in an aqueous solution is divided into two types of reactions: decomposition to OH radicals with oxidizing power and decomposition to water and oxygen. The production of OH radicals from hydrogen peroxide is an important factor in the oxidation of persistent wastewater. The selectivity for the decomposition of hydrogen peroxide depends on the acidity of wastewater. When the wastewater is acidic, the selectivity for the production of OH radicals increases. Thus, the pH of the wastewater is maintained at 2 to 6, preferably 3 to 4 in the method of the present invention. The pH can be adjusted by adding at least one acid selected from the group consisting of sulfuric acid, hydrochloric acid, phosphoric acid, and nitric acid to the wastewater. However, the acid is not necessarily to limited to sulfuric acid, hydrochloric acid, phosphoric acid, and nitric acid.

The present invention will be explained in more detail with reference to the following examples, including experimental examples.

Example 1: Preparation of Pt—$Fe_2O_3$/SBA-15 Catalyst

Mesoporous silica (SBA-15, Sigma-Aldrich) is dried at 100° C. for 24 h. An aqueous solution of ferric nitrate nonahydrate ($Fe(NO_3)_3 \cdot 9H_2O$, Sigma-Aldrich) as an iron precursor is impregnated into the dried SBA-15 by incipient wetness impregnation. The aqueous iron oxide precursor solution is impregnated in such an amount that the weight of iron is 5 wt. % with respect to the weight of SBA-15. Next, the carrier is dried at 100° C. for 12 h. The carrier is heated at a rate of 1° C./min to 500° C. and calcined at that temperature for 6 h. An aqueous solution of tetraammineplatinum(II) nitrate ($Pt(NH_3)_4(NO_3)_2$, Sigma-Aldrich) as a platinum precursor is impregnated into the iron oxide/SBA-15 catalyst by incipient wetness impregnation. The aqueous platinum precursor solution is impregnated in such an amount that the weight of platinum is 1 wt. % with respect to the weight of SBA-15. Next, the carrier is dried at 100° C. for 12 h. Finally, the carrier is heated at a rate of 1° C./min to 500° C. and calcined at that temperature for 6 h.

Comparative Example 1: Pt/SBA-15

A catalyst is synthesized in the same manner as in Example 1, except that iron oxide is not impregnated.

Comparative Example 2: $Fe_2O_3$/SBA-15

A catalyst is synthesized in the same manner as in Example 1, except that platinum is not impregnated.

Experimental Example 1: Observation with
Scanning Transmission Electron Microscope The catalysts of Example 1 and Comparative Examples 1 and 2 are observed with a scanning transmission electron microscope (STEM). The images are shown in FIG. 1. The STEM image of the catalyst of Example 1 reveals the impregnation of platinum and iron oxide in the mesoporous silica. The platinum is more uniformly impregnated in the catalyst of Example 1 than in the catalyst of Comparative Example 1 in which only platinum is impregnated.

Experimental Example 2: Measurement of Platinum
and Iron Contents by Inductively Coupled
Plasma-Optical Emission Spectroscopy (ICP-OES)

The contents of platinum and iron in the catalysts of Example 1 and Comparative Examples 1 and 2 are measured by ICP-OES. The results are shown in Table 1.

TABLE 1

|  | Platinum (wt. %) | Iron (wt. %) |
|---|---|---|
| Example 1 | 1.0 | 5.2 |
| Comparative Example 1 | 1.1 | — |
| Comparative Example 2 | — | 5.0 |

As can be seen from the results in Table 1, the desired amounts of platinum and iron are impregnated into the catalysts of Example 1 and Comparative Examples 1 and 2.

Experimental Example 3: Treatment of Phenol by
Oxidation

Phenol is diluted to 100 ppm in 100 mL of water in a double-jacketed reactor, and thereafter, a 0.1 N sulfuric acid solution is added to the phenol solution until the pH is adjusted to 3. Then, 50 mg of each of the catalysts of Example 1 and Comparative Examples 1 and 2 is dispersed and 35 wt. % $H_2O_2$ is added such that the concentration of hydrogen peroxide is set to 500 ppm. The reaction temperature is set to 20° C. using a circulator. Thereafter, sampling is performed at 15, 30, 60, and 120 min. The hydrogen peroxide and phenol concentrations of the samples are measured using a UV-vis spectrophotometer and an HPLC system.

Figure 2:
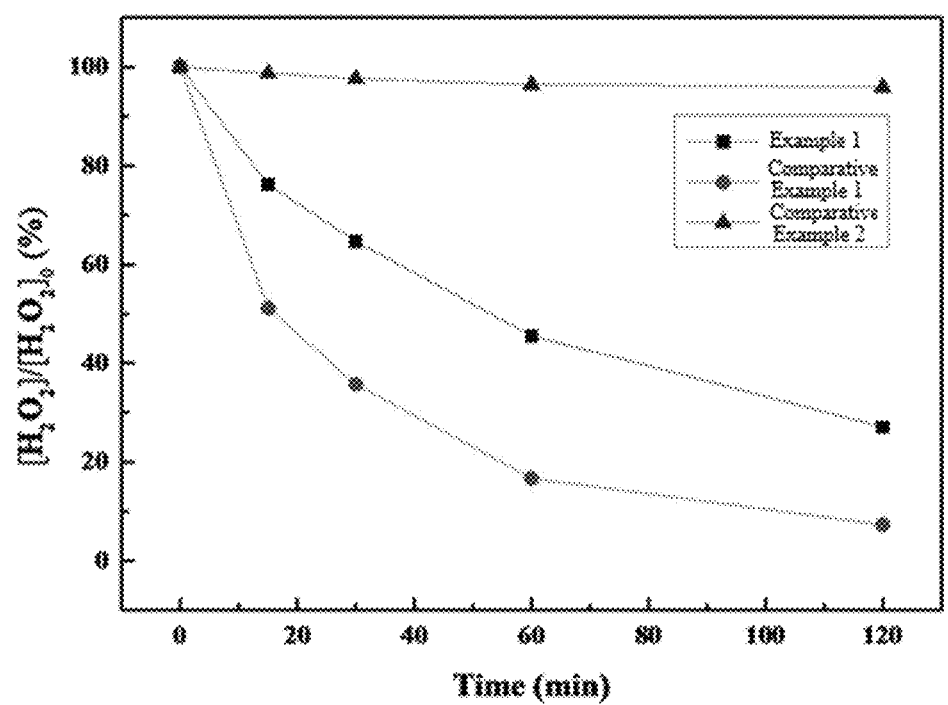
FIG. 2 graphically shows the activities of catalysts for wastewater treatment prepared in Example 1 and Comparative Examples 1 and 2 for the decomposition of hydrogen peroxide.
Figure 3:
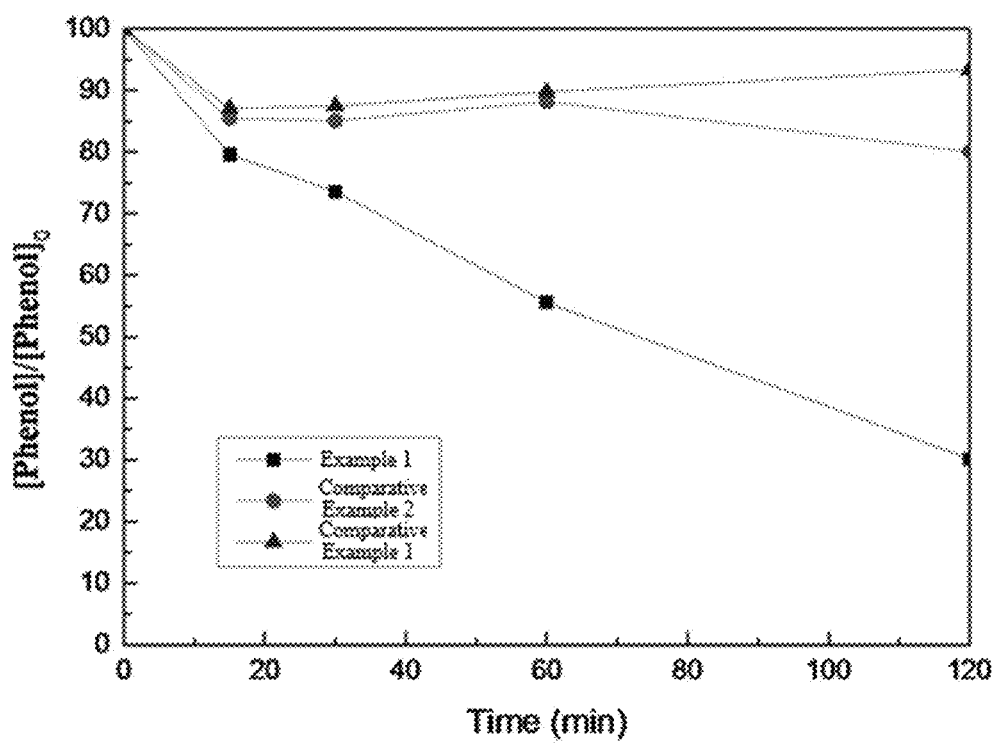
FIG. 3 graphically shows the activities of catalysts for wastewater treatment prepared in Example 1 and Comparative Examples 1 and 2 for the removal of phenol.

Variations in the hydrogen peroxide and phenol concentrations are shown in FIGS. 2 and 3, respectively. Referring to FIG. 2, the hydrogen peroxide concentration is maintained almost unchanged due to the low activity of the iron oxide catalyst. Referring to FIG. 3, when the catalyst of Example 1 is used, a phenol removal of ~70% is achieved after a 2 h reaction, demonstrating that the catalyst of Example 1 is suitable for the oxidation of wastewater compared to the catalysts of Comparative Examples 1 and 2.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention. Such simple modifications and improvements of the present invention belong to the scope of the present invention, and the specific scope of the present invention will be clearly defined by the appended claims.

What is claimed is:
1. A method for wastewater treatment comprising:
preparing a catalyst for wastewater treatment; and
adding the catalyst and hydrogen peroxide to wastewater to react with the wastewater, wherein the preparing the catalyst comprises:
   (a) impregnating an aqueous iron oxide precursor solution into the pores of a porous carrier;
   (b) primarily calcining the porous carrier impregnated with the aqueous iron oxide precursor solution;
   (c) impregnating an aqueous platinum precursor solution into the pores of the primarily calcined porous carrier; and
   (d) secondarily calcining the porous carrier impregnated with the aqueous platinum precursor solution,
wherein a pH of the wastewater is adjusted to pH 3 to 4 by adding an acid to the wastewater,
wherein the catalyst and the hydrogen peroxide react with the wastewater at an overall reaction temperature of 15 to 40° C., and
wherein the porous carrier is an activated carbon carrier or a mixture of the activated carbon carrier and a silica carrier.

2. The method according to claim 1, wherein the pH is adjusted by adding at least one acid selected from the group consisting of a sulfuric acid, a hydrochloric acid, a phosphoric acid, and a nitric acid to the wastewater.

3. The method according to claim 1, wherein the wastewater contains at least one pollutant selected from the group consisting of a phenol and a nitrophenol.

4. The method according to claim 3, wherein the pollutant is present at a concentration of 1 to 1000 ppm.

5. The method according to claim 1, wherein the concentration of the hydrogen peroxide is from 5 to 5000 ppm.

6. A method for wastewater treatment comprising:
preparing a catalyst for wastewater treatment; and
adding the catalyst and hydrogen peroxide to wastewater to react with the wastewater, wherein the preparing the catalyst comprises:
   (a) impregnating an aqueous iron oxide precursor solution into the pores of a porous carrier;
   (b) primarily calcining the porous carrier impregnated with the aqueous iron oxide precursor solution;
   (c) impregnating an aqueous platinum precursor solution into the pores of the primarily calcined porous carrier; and
   (d) secondarily calcining the porous carrier impregnated with the aqueous platinum precursor solution,
wherein a pH of the wastewater is adjusted by adding at least one acid selected from the group consisting of a hydrochloric acid, a nitric acid, and a mixture thereof to the wastewater, and
wherein the porous carrier is an activated carbon carrier or a mixture of the activated carbon carrier and a silica carrier.

7. The method according to claim 6, wherein the pH of the wastewater is adjusted to 2 to 6 by adding the at least one acid.

8. The method according to claim 6, wherein the wastewater contains at least one pollutant selected from the group consisting of phenol and nitrophenol.

9. The method according to claim 8, wherein the pollutant is present at a concentration of 1 to 1000 ppm.

10. The method according to claim 6, wherein a concentration of the hydrogen peroxide is from 5 to 5000 ppm.

11. The method according to claim 6, wherein the reaction temperature is from 15 to 40° C.

12. The method according to claim 6, wherein an iron oxide is impregnated in an amount of 1 to 10% by weight, based on a total weight of the porous carrier.

13. The method according to claim 6, wherein a platinum is impregnated in an amount of 0.1 to 5% by weight, based on a total weight of the porous carrier.

14. The method according to claim 1, wherein an iron oxide is impregnated in an amount of 1 to 10% by weight, based on a total weight of the porous carrier.

15. The method according to claim 1, wherein a platinum is impregnated in an amount of 0.1 to 5% by weight, based on a total weight of the porous carrier.

\* \* \* \* \*